(12) United States Patent
Walter

(10) Patent No.: US 7,845,439 B2
(45) Date of Patent: Dec. 7, 2010

(54) DEVICE FOR REVERSING THE STEERING MOVEMENT OF A STEERING WHEEL SHAFT

(75) Inventor: Alexander Walter, Augsburg (DE)

(73) Assignee: RENK Aktiengesellschaft, Augsburg (DE)

( * ) Notice: Subject to any disclaimer, the term of this patent is extended or adjusted under 35 U.S.C. 154(b) by 705 days.

(21) Appl. No.: 11/445,116

(22) Filed: Jun. 1, 2006

(65) Prior Publication Data
US 2006/0272864 A1    Dec. 7, 2006

(30) Foreign Application Priority Data
Jun. 2, 2005    (DE) .................... 10 2005 025 302

(51) Int. Cl.
*B62D 11/02* (2006.01)
(52) U.S. Cl. .................. 180/6.66; 280/93.513; 475/299
(58) Field of Classification Search ............ 280/93.513; 475/299
See application file for complete search history.

(56) References Cited

U.S. PATENT DOCUMENTS

| | | | | |
|---|---|---|---|---|
| 5,538,481 A | * | 7/1996 | Friedmann | ................... 475/142 |
| 6,139,045 A | * | 10/2000 | Vandenbark et al. | ........ 280/638 |
| 6,267,704 B1 | * | 7/2001 | Patterson et al. | ............ 475/298 |
| 6,561,935 B2 | * | 5/2003 | Peeters et al. | .................. 474/37 |
| 6,951,259 B2 | * | 10/2005 | Irikura | ........................ 180/6.3 |
| 2006/0027405 A1 | * | 2/2006 | Witzenberger | ............. 180/6.66 |

FOREIGN PATENT DOCUMENTS

| | | |
|---|---|---|
| DE | 1 480 428 | 8/1969 |
| DE | 29 48 214 | 10/1989 |
| DE | 38 19 446 | 12/1989 |
| DE | 196 06 793 | 4/1997 |
| FR | 2 094 652 | 2/1972 |

\* cited by examiner

*Primary Examiner*—Tony H. Winner
*Assistant Examiner*—Jacob Knutson
(74) *Attorney, Agent, or Firm*—Cohen Pontani Lieberman & Pavane LLP

(57) ABSTRACT

A device for reversing a steering movement of a steering wheel shaft of a vehicle includes a switching element movable between two switching positions to activate or deactivate the reversal of the steering movement. A mechanical actuating device includes a shaft which is rotatable in different rotational directions, and a slide for actuating the switching element. The slide can be moved along the axial direction of the shaft as a function of the rotational direction of the shaft in order to transfer the switching element between the switching positions.

20 Claims, 1 Drawing Sheet

DEVICE FOR REVERSING THE STEERING MOVEMENT OF A STEERING WHEEL SHAFT

BACKGROUND OF THE INVENTION

1. Field of the Invention

The invention relates to a device for reversing the steering movement of a steering wheel shaft, and to an actuating device for a switching element used in such device for reversing the steering movement.

2. Description of the Related Art

Tracked vehicles are steered by producing different rotational speeds in a targeted manner at the tracks of the tracked vehicle. In contrast, wheeled vehicles are steered, for example, by rotating the front wheels about vertical axes. These different steering principles of tracked vehicles and wheeled vehicles lead to a tracked vehicle reacting to a steering request during forward travel in exactly the same way as a wheeled vehicle, whereas the tracked vehicle reacts to a steering request during rearward travel in an opposite manner to a wheeled vehicle. As, however, there is often the desire for a tracked vehicle to react to a steering request in exactly the same way as a wheeled vehicle, devices for reversing the steering movement of a steering wheel shaft, which are known as steering direction switchover devices, are used in tracked vehicles. Steering direction switchover devices of this type ensure a reversal of the steering movement during rearward travel of a tracked vehicle, with the result that a tracked vehicle also reacts to a steering request during rearward travel in exactly the same way as a wheeled vehicle.

Devices of this type for reversing the steering movement of a steering wheel shaft are known from DE 29 48 214, DE 38 19 446, DE 196 06 793 and US 2006/027405.

The devices which are known from the prior art for reversing the steering movement of a steering wheel shaft of a motor vehicle have a switching element, which activates or deactivates the reversal of the steering movement as a function of its switching position. In the devices for reversing the steering movement which are known in the art, the switching element is actuated electrically or hydraulically. As, however, the steering system is a device which is relevant to safety, redundancies or other complex protective apparatuses have to be provided in the case of hydraulic or electric actuation of the switching element, in order to always ensure a functioning steering system. This causes high costs.

SUMMARY OF THE INVENTION

Proceeding from this, it is an object of the present invention to provide a novel, reliable and cost-saving device for reversing the steering movement of a steering wheel shaft.

According to a preferred embodiment of the invention, the switching element can be actuated with the aid of a mechanical actuating device, which comprises a slide which actuates the switching element and can be moved along the axial direction of a shaft as a function of the rotational direction of the shaft in order to actuate the switching element.

The switching element is actuated in a purely mechanical way with the aid of the mechanical actuating device. The slide of the actuating device is moved along the axial direction of the shaft as a function of the rotational direction of the shaft in order to transfer the slide between different slide positions and therefore to transfer the switching element between its two switching positions, and in order to activate or deactivate the reversal of the steering movement.

The activation or actuation according to the invention of the switching element is simple in structural terms and very reliable. It is possible to omit expensive redundancies and complex protective apparatuses which are required in the case of hydraulic or electric actuation of the switching element.

According to a preferred embodiment of the invention, the slide of the mechanical actuating device is in engagement with at least two toothing systems during the movement along the shaft, which toothing systems have different pitches and can be driven with a rotational speed difference relative to one another. In two slide positions, the slide is not in engagement with at least one of the toothing systems, and it is possible, at a standstill of the shaft, to bring the slide into engagement with the toothing systems via at least one restoring element, in particular via spring elements which couple the slide to the switching element with a force-transmitting fit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

In the following, the present invention will be described in greater detail with reference to FIGS. 1 and 2.

Figure 1:
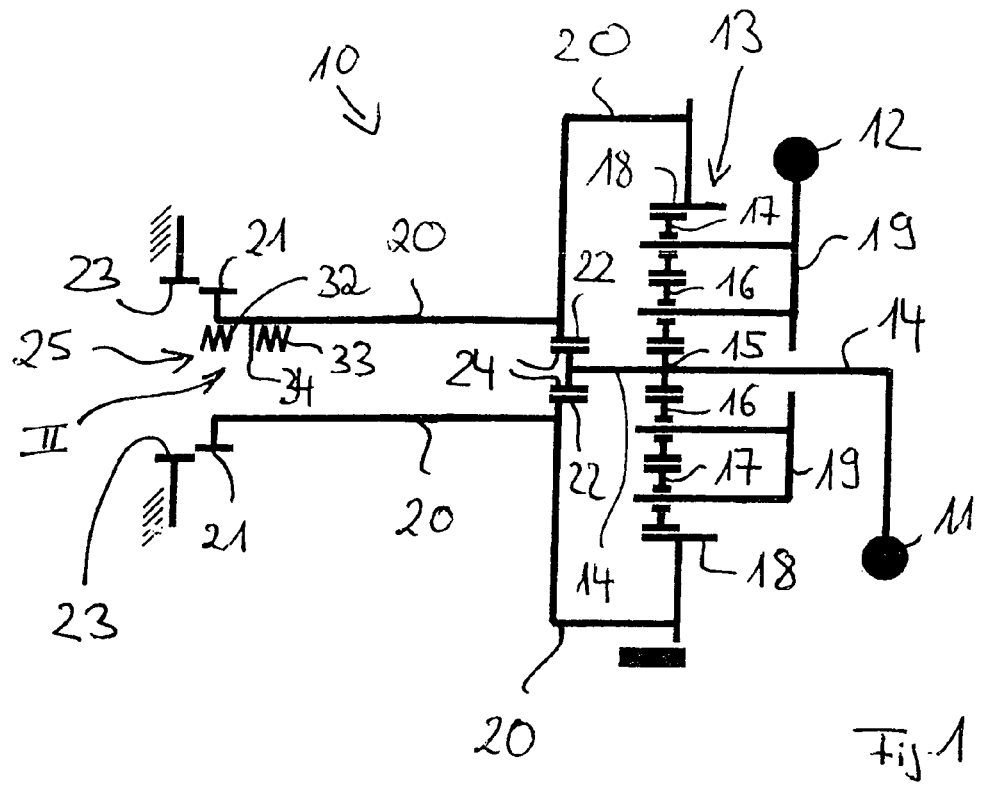
FIG. 1 is a diagrammatic illustration of a device according to the invention for reversing the steering movement of a steering wheel shaft.

FIG. 1 shows an exemplary embodiment of a device 10 for reversing the steering movement of a steering wheel shaft of a motor vehicle. The driver sets a desired steering direction via a steering wheel 11, which desired steering direction is transmitted to the steering system via a lever 12. The device 10 for reversing the steering movement according to FIG. 1 comprises a planetary gear mechanism 13, the steering wheel 11 being connected to a sun gear 15 of the planetary gear mechanism 13 via a steering wheel shaft 14. In the exemplary embodiment of FIG. 1, the planetary gear mechanism 13 is configured as a double planetary gear mechanism and accordingly has a plurality of planetary gears, namely first planetary gears 16 which are in engagement with the sun gear 15, and second planetary gears 17 which are in engagement firstly with an internal gear 18 and secondly with the first planetary gears 16. The planetary gears 16 and 17 are mounted rotatably on a planetary carrier 19, on which the lever 12 acts. Furthermore, in addition to the planetary gear mechanism 13, the device 10 for reversing the steering movement has a switching element 20, the reversal of the steering movement being activated or deactivated as a function of the switching position of the switching element 20. The switching element 20 is mounted rotatably, wherein firstly the internal gear 18 and secondly toothing systems 21 and 22 are arranged on the switching element 20. The toothing system 21 interacts with a corresponding toothing system 23 which is fixed to the housing, as a function of the switching position of the switching element 20. In contrast, the toothing system 22 interacts with a corresponding toothing system 24 of the steering wheel shaft 14 as a function of the switching position of the switching element 20. The reversal of the steering movement is either active or inactive as a function of the position of the switching element 20 and accordingly as a function of the engagement of the toothing systems 21 and 22 with the corresponding toothing systems 23 and 24.

Within the context of the present invention, the switching element 20 is activated or actuated exclusively in a mechanical way with the aid of a mechanical actuating device 25. FIG. 2 shows the actuating device 25 in greater detail.

The actuating device 25 brings about actuation of the switching element 20 with the aid of a slide 26 which is mounted on a shaft 27, wherein the actuation is dependent on the rotational direction of the shaft 27. In the exemplary embodiment shown, the shaft 27, on which the slide 26 is mounted, branches off from a central shaft (not shown) of a drive system of a vehicle to be steered, the shaft 27 rotating in the direction of the central shaft, thus being dependent on the driving direction of the vehicle to be steered. The slide 26 can be moved in the axial direction of the shaft 27 as a function of the rotational direction of the shaft 27, in order to actuate the switching element 20 and to transfer the latter between the two switching positions.

Figure 2:
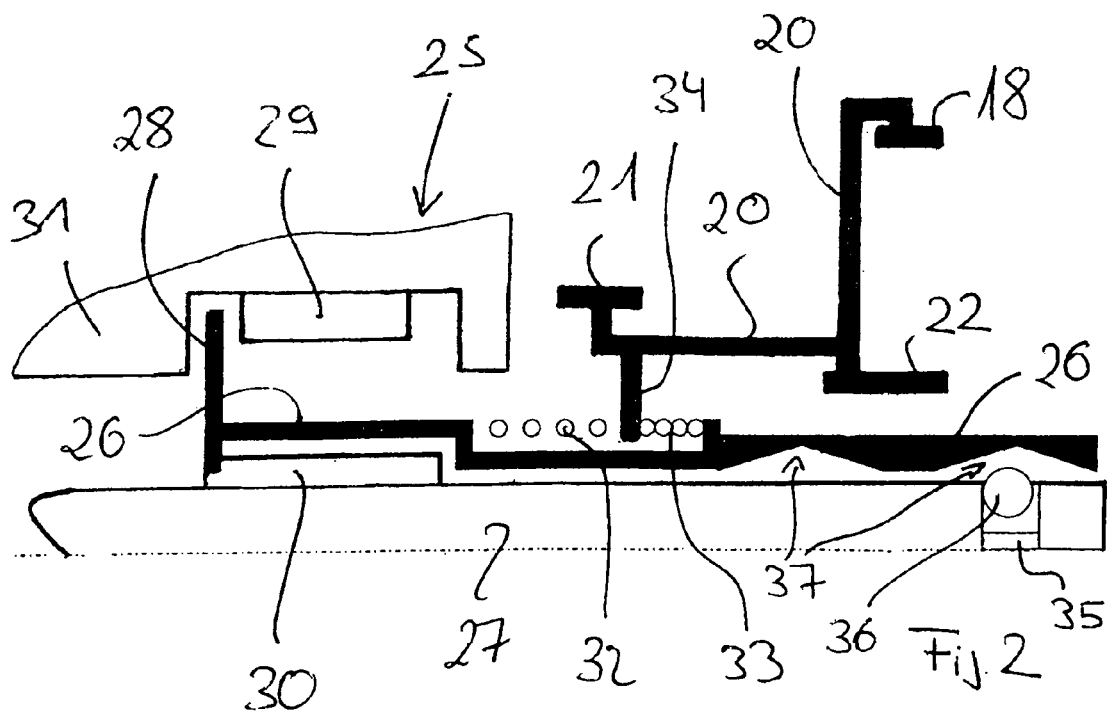
FIG. 2 is a diagrammatic cross-sectional view of an actuating device and a switching element of the device according to FIG. 1.

According to FIG. 2, the slide 26 has a section 28 which carries a toothing system and is in engagement with toothing systems 29 and 30. In the exemplary embodiment shown, one of the toothing systems 29, with which the section 28 of the slide 26 is in engagement, is configured to be fixed to the housing or is stationary, whereas another toothing system 30 is assigned to the shaft 27 and rotates with the latter. The toothing systems 29 and 30, with which the slide 26 is in engagement during the movement of the slide 26 in the axial direction of the shaft 27, can accordingly be driven with a differential rotational speed relative to one another, as the toothing systems 29 and 30 have different pitches. In the exemplary embodiment shown, the toothing system 30 which is assigned to the shaft 27 and rotates with the latter is configured as a helical toothing system having a helix angle of preferably 45°, whereas the toothing system 29 which is stationary or fixed in terms of rotation and is assigned to a housing 31 is configured as a spur toothing system.

During the movement of the slide 26 in the axial direction of the shaft 27, which movement is dependent on the rotational direction of the shaft 27, the section 28 is in engagement with both toothing systems 29 and 30. If, in contrast, the slide 26 reaches one of its two slide positions which correspond to the switching positions of the switching element 20, the slide 26 or the section 28 of the latter is not in engagement with at least one of the two toothing systems 29, 30.

FIG. 2 shows the slide 26 in a left-hand slide position, in which the slide 26 or the section 28 of the latter is not in engagement with the toothing system 29 which is fixed to the housing and therefore fixed in terms of rotation, with the result that the slide 26 can rotate freely with the shaft 27 in this slide position. The same is true in the right-hand slide position of the slide 26, in which the section 28 of the latter is again not in engagement with the toothing system 29 which is stationary or fixed in terms of rotation, and is in engagement with the corotating toothing system 30. In contrast thereto, during the movement of the slide 26 in the axial direction of the shaft 27, the section 28 is in engagement with both toothing systems 29 and 30, the slide 26 thus being displaced in the axial direction of the shaft 27 as a result of the fact that at least one of the two toothing systems 29 and 30 is configured as a helical toothing system. Here, the direction of the displacement depends on the rotational direction of the shaft 27.

According to FIG. 2, the slide 26 is coupled to the switching element 20 via spring elements 32 and 33 with a force-transmitting fit. Both spring elements 32 and 33 are supported with one end on the slide 26 and with the respective opposite end on a projection 34 of the switching element 20. In the left-hand slide position (shown in FIG. 2) of the slide 26, the spring element 33 is tensioned and the spring element 32 is relaxed. As a result, the switching element 20 is likewise pressed into a left-hand switching position by the spring forces which are provided by the spring elements 32 and 33. If, in contrast, the slide 26 is situated in its right-hand slide position, the spring element 32 is tensioned and the spring element 33 is relaxed, the switching element 20 thus being transferred into a right-hand switching position by the corresponding spring forces.

Furthermore, the spring elements 32 and 33 provide a restoring force which acts on the slide 26 and leads to the slide 26 coming into engagement with both toothing systems 29 and 30 in the event of a change of the rotational direction of the shaft 27, and it is therefore possible for the slide 26 to be moved in the axial direction of the shaft 27. At a standstill of the shaft 27, the spring elements 32 and 33 also move the slide 26 into engagement with both toothing systems 29 and 30.

As has already been mentioned, the slide 26 is not in engagement with the toothing system 29 which is stationary or fixed in terms of rotation, both in the left-hand and the right-hand slide position. However, the slide 26 is pressed back in the direction of the toothing system 29 by the spring elements 32 and 33 which act as restoring elements, which can lead to grating of the slide 26 on the edge of the toothing system 29. In order to suppress or to reduce the grating and therefore to increase the service life of the device, it is proposed according to one embodiment of the invention to position balls 36 in a driving toothing system 35 of the shaft 27, which balls 36 rotate with the shaft 27 and on which balls 36 centrifugal forces act as a function of the rotational speed of the shaft 27. Both in the left-hand slide position and in the right-hand slide position of the slide 26, the balls 36 interact with recesses or grooves 37 which are assigned accordingly to the slide 26 and have walls which extend obliquely and converge in a radially outward manner. As a result of the centrifugal forces which act on the balls 36, the balls 36 are pressed in a radially outward manner into the grooves 37, the slide 26 being moved further against the springs 32 and 33 by the pressing force of the balls 36 in the grooves 37, until the balls 36 reach the lowest point of the respective groove 37. The geometry of the slide 26 is configured in such a way that there is no more contact between the slide 26 and the toothing system 29, which is stationary or fixed in terms of rotation, of the housing 31 in this position of the balls 36. The slide 26 then extends freely at high vehicle speeds and therefore at high rotational speeds of the shaft 27, while the springs 32 and 33 press the slide 26 against the toothing system 29 at lower speeds of the vehicle and when the latter is at a standstill, in order to realize rapid switchover of the steering movement.

In contrast to the exemplary embodiment shown, it is possible to configure the toothing system 29, which is fixed in terms of rotation, as a helical toothing system and the toothing system 30, which is assigned to the shaft 27, as a spur toothing system. It is also possible for both toothing systems 29 and 30 to be configured as helical toothing systems with different helix angles.

The toothing system 29 likewise does not have to be assigned to the housing 31, but can also be driven rotationally, to be precise with a differential rotational speed with respect to the toothing system 30 of the shaft 27. If both toothing systems 29 and 30 are driven rotationally, the switchover speed of the actuating device 25 can be adjusted.

In the exemplary embodiment shown, in both slide positions which correspond to the switching positions of the switching element 20, the slide 26 passes out of engagement with the toothing system 29 which is fixed in terms of rotation, with the result that the slide 26 rotates freely with the shaft 27. As an alternative, it is also possible for the slide 26 not to be in engagement with the corotating toothing system 30 in both slide positions, but to be in engagement with the stationary toothing system 29, with the result that the slide 26 then remains stationary with the housing 31 and with the toothing system 29 which is fixed in terms of rotation.

In the exemplary embodiment shown in FIG. 2, the slide 26 and the switching element 20 are configured as separate assemblies. It is also possible to combine the slide 26 and the switching element 20 to form one component.

Furthermore, in contrast to the exemplary embodiment shown, it is possible to separate the slide 26 and the switching element 20 spatially from one another. The slide 26 can therefore be arranged, for example, on the central shaft, while the switching element 20 is positioned near the steering wheel. In this case, there can then be a connection between the slide 26 and the switching element 20, for example via a linkage or a bowden cable.

In a deviation from the exemplary embodiment shown, the spring elements 32 and 33 which are shown in FIGS. 1 and 2 can act against the housing 31 and against the slide 26 or the switching element 20.

The invention is not restricted to be used in conjunction with the steering direction switchover device 10 which is shown in FIG. 1. Rather, the invention can also be used, for example, in the steering direction switchover devices which are disclosed in DE 29 48 214, DE 38 19 446 or DE 196 06 793.

The mechanical actuating mechanism which is shown in FIG. 2 is accordingly not designed for use in a specific steering direction switchover device. Rather, the actuating mechanism can be used everywhere in a vehicle where a switchover is required which is dependent on a rotational direction of a vehicle part.

The invention is not limited by the embodiments described above which are presented as examples only but can be modified in various other ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for reversing a steering movement of a steering wheel shaft of a vehicle, having:

a switching element movable between two switching positions to activate or deactivate the reversal of the steering movement;

a mechanical actuating device comprising a shaft and a slide configured to actuate said switching element, said shaft extending along an axial direction and being rotatable in opposite rotational directions about said axis, and said slide being movable along said axis in an axial direction of said shaft which is a function of a rotational direction of said shaft to transfer said switching element between said switching positions;

a first toothing system having a first pitch; and a second toothing system having a second pitch, the first and second pitches being different; the first and second toothing systems being driven with a rotational speed difference relative to one another and being engagable with said slide to move said slide relative to said shaft as a function of the rotational direction of said shaft and to transfer said slide between two slide positions which correspond to said two switching positions of said switching element, wherein said slide is in engagement with said first and second toothing systems during the movement of said slide along said shaft, said slide is disengaged from at least one of said first and second toothing systems in each of said two slide positions.

2. The device according to claim 1, further comprising at least one restoring element for bringing said slide into engagement with said first and second toothing systems at a standstill of said shaft.

3. The device according to claim 1, further comprising spring elements for coupling said slide to said switching element with a force-transmitting fit.

4. The device according to claim 3, wherein said spring elements bring said slide into engagement with said first and second toothing systems at a standstill of said shaft.

5. The device according to claim 1, further comprising a stationary housing, wherein said first toothing system is assigned to said shaft and rotates together with said shaft, and wherein said second toothing system is assigned to said stationary housing and is stationary.

6. The device according to claim 1, wherein said first toothing system is assigned to said shaft and rotates together with said shaft, and wherein said second toothing system rotates at a different rotational speed relative to said first toothing system.

7. The device according to claim 1, wherein said first toothing system is configured as a helical toothing system and said second toothing system is configured as a spur toothing system.

8. The device according to claim 1, wherein both said first and second toothing systems are configured as helical toothing systems having different helix angles.

9. The device according to claim 1, wherein the rotational speed of said shaft exerts centrifugal forces on said slide in each of said two slide positions, which centrifugal forces move said slide completely out of engagement with one of said first and second toothing systems in each of said two slide positions.

10. An actuating device in a vehicle for an actuation of a switching element movable between two switching positions, said actuating device comprising:

a shaft and a slide for actuating said switching element, said shaft extending along an axial direction and being rotatable in opposite rotational directions about said axis, and said slide being movable along said axis in an axial direction of said shaft which is a function of the rotational direction of said shaft in order to transfer said switching element between said switching positions;

a first toothing system having a first pitch; and a second toothing system having a second pitch, the first and second pitches being different; the first and second toothing systems being driven with a rotational speed difference relative to one another and being engagable with said slide to move said slide relative to said shaft as a function of the rotational direction of said shaft and to transfer said slide between two slide positions which correspond to said two switching positions of said switching element, wherein said slide is in engagement with said first and second toothing systems during the movement of said slide along said shaft, said slide is disengaged from at least one of said first and second toothing systems in each of said two slide positions.

11. The actuating device according to claim 10, further comprising at least one restoring element for bringing said slide into engagement with said first and second toothing systems at a standstill of said shaft.

12. The actuating device according to claim 10, further comprising spring elements for coupling said slide to said switching element with a force-transmitting fit.

13. The actuating device according to claim 12, wherein said spring elements bring said slide into engagement with said first and second toothing systems at a standstill of said shaft.

14. The actuating device according to claim 10, further comprising a stationary housing, wherein said first toothing system is assigned to said shaft and rotates together with said shaft, and wherein said second toothing system is assigned to said stationary housing and is stationary.

15. The actuating device according to claim 10, wherein said first toothing system is assigned to said shaft and rotates together with said shaft, and wherein said second toothing system rotates at a different rotational speed relative to said first toothing system.

16. The actuating device according to claim 10, wherein said first toothing system is configured as a helical toothing system and said second toothing system is configured as a spur toothing system.

17. The actuating device according to claim 10, wherein both said first and second toothing systems are configured as helical toothing systems having different helix angles.

18. The actuating device according to claim 10, wherein the rotational speed of said shaft exerts centrifugal forces on said slide in each of said two slide positions, which centrifugal forces move said slide completely out of engagement with one of said first and second toothing systems in each of said two slide positions.

19. The device according to claim 1, further comprising a driving toothing system included in the shaft, the driving toothing system having balls positioned therein, which balls rotate with the shaft and on which balls centrifugal forces act as a function of a rotational speed of the shaft.

20. The device according to claim 19, wherein the balls interact with recesses in the slide in each of the two slide portions.

* * * * *